Patented Feb. 25, 1947

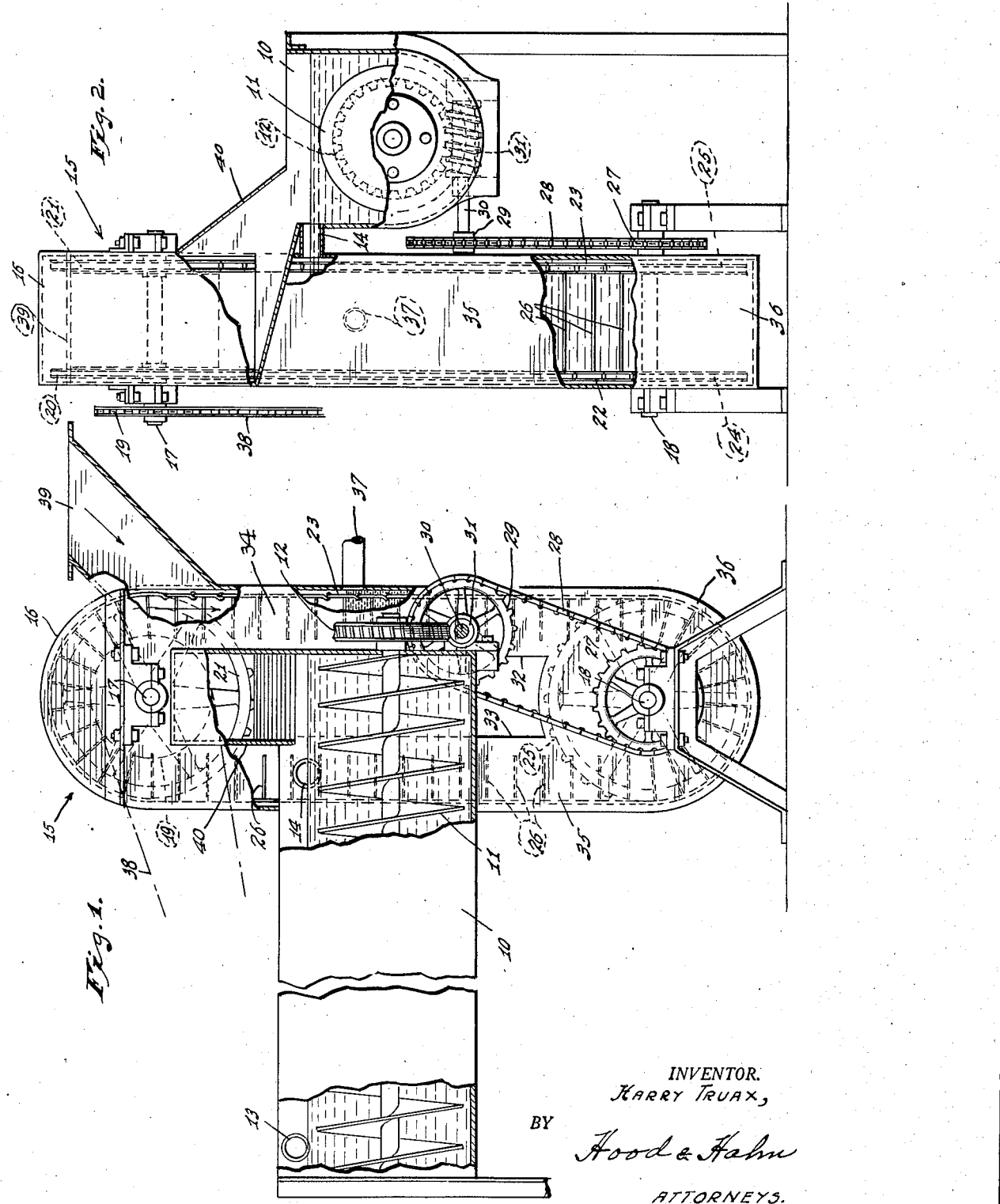

2,416,421

UNITED STATES PATENT OFFICE 2,416,421

OIL EXTRACTOR AND SEPARATOR MECHANISM

Harry Truax, Indianapolis, Ind., assignor to Indiana Farm Bureau Co-Operative Association, Inc., Indianapolis, Ind., a corporation of Indiana Application October 12, 1944, Serial No. 558,382

4 Claims. (Cl. 23—270)

The present invention relates to separator mechanism, and is primarily concerned with structures, intended for the purpose of separating suspended solids, and particularly very fine solids, from a liquid which is to be cleared. Specifically, the mechanism of the present invention has been designed for the purpose of removing the fines from the miscella in connection with the extraction and purification of soy bean oil; but it will be obvious that the invention is applicable to the problem of removing solids from any kind of liquid suspension.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of the mechanism of the present invention, parts being broken away for clarity of illustration; and Fig. 2 is an end elevation, parts being shown in section or broken away.

Referring more particularly to the drawings, it will be seen that the reference numeral 10 indicates an extracting vat. A mixture of solids and liquid is charged into the vat 10 from any suitable source, such as, for instance, a soy bean flaking mill which may be of the character disclosed in my prior Patent No. 2,306,655, issued December 29, 1942.

A screw conveyor 11 is mounted in the vat 10 and is adapted to be rotated in a counterclockwise direction, as viewed from the right, thus tending to carry solid materials toward the left-hand end of the vat 10, where they are discharged through a suitable outlet (not shown). A large proportion of the solid material fed to the vat 10 will sink gradually toward the bottom of the vat, and will be readily carried through the vat by the conveyor 11; but finely divided solid material will be held in suspension in the liquid, or may actually float therein.

A suitable solvent for the oil to be extracted is admitted to the vat 10, in a constant flow, through an inlet port 13 adjacent the left-hand end of the vat; and the solution of oil to be collected in that solvent is decanted continuously from the surface of the mixture in the vat through an outlet 14 adjacent the right-hand end of the vat. According to standard practice, the material decanted through the outlet 14 is conducted to a still where the solvent is distilled off from the oil, the oil being collected and conducted from the still to suitable containers. A considerable mass of finely divided solid material will flow out of the vat through the outlet 14 with the liquid solution; and unless that solid material is separated from the liquid before the liquid reaches the still, those masses of solids will, of course, collect in the bottom of the still in a thoroughly undesirable fashion.

Attempts have been made in the commercial art, to separate the solids from the liquid emerging from the outlet 14 by standard filtering equipment or by screening; but the material is so fine that it passes through ordinary screen, or very rapidly completely clogs standard filtering equipment. Since the process is otherwise capable of being made continuous, it is highly desirable to overcome the necessity for shutting down the process frequently to clear the separating equipment; and the present invention provides a continuously operating separating mechanism which is capable of handling the kind of separation problem above described.

Adjacent the vat 10 is mounted my separating unit which is indicated generally by the reference numeral 15, and which comprises a substantially closed tank 16. Adjacent the upper end of the tank 16 is suitably journalled a shaft 17, and a similar shaft 18 is similarly journalled adjacent the bottom of the tank. A driving sprocket 19 is carried outboard on the shaft 17; and a pair of sprockets 20 and 21 are carried on said shaft within the tank 16. Conveyor chains 22 and 23 run over the sprockets 20 and 21 and to sprockets 24 and 25 carried on the shaft 18. Said continuous conveyor chains 22 and 23 mount a series of foraminous trays 26. As is clearly to be seen from an inspection of Fig. 1, the conveyor chains 22 and 23 run adjacent the outermost walls of the tank 16, and the trays 26 are supported only at their outer edges upon said chains, said trays projecting inwardly and being free and unobstructed at their inner ends.

The shaft 18 carries an outside sprocket 27 from which a chain 28 runs to a sprocket 29 carried upon a shaft 30 suitably journalled in the walls of the vat 10 and mounting a worm gear 31 which meshes with the worm wheel 12 carried on the shaft of the screw 11. Thereby a driving connection is provided between the input chain 38 and the screw 11, through the shaft 17, sprockets 20 and 21, chains 22 and 23, sprockets 24 and 25, shaft 18, sprocket 27, chain 28, sprocket 29, worm 31, and worm wheel 12.

The tank 16 is provided with inner walls 32 and 33 defining separate, substantially vertical legs 34 and 35 which are joined through the lower section 36 of the tank 16. Said walls 32 and 33 extend well above the outlet 37 and the inlet 14, so that the liquid level in the tank 16 will not normally rise to the height of the upper ends of the walls 32 and 33. Thus, liquid flow through the tank 16 must be from the vat outlet 14 into the leg 35, down through the junction section 36, thence up through the leg 34, and out through the outlet 37.

The shafts 17 and 18 will rotate in a clockwise direction as viewed in Fig. 1 to carry the trays 26 downwardly through the leg 34 and upwardly through the leg 35, counter to the direction of flow of liquid through the tank 16. Thus, the trays 26 move through the flowing liquid, and tend to arrest solids suspended or entrained in that liquid, and to collect such solids. As the trays move upwardly through the leg 35, they emerge from the surface of the liquid in that leg, carrying the solids which have been collected as the trays pass through the liquid in the tank 16.

It has been found that it is sometimes necessary or desirable to provide the trays 26 with a mat of discrete particles to assist in the collection of solids from the liquid through which the trays move. For that purpose, I provide a charging chute 39 communicating with the tank leg 34, and through which may be fed to the tank 16 any suitable material such as flaked grain or seed, cracked corn, or the like.

If desired, the freshly flaked oil bearing particles may be screened as they leave the flaking mill, and the fines may be permitted to fall into the vat 10, while the coarser unextracted particles may be led, through the chute 39 or otherwise, directly into the tank leg 34. In that case, of course, the extraction operation will take place as the coarser material travels through the tank 16.

In the particular process for which the present invention was primarily developed, it is necessary that the material charged through the chute 39 shall be suitable for consumption by farm stock, since the solids discharged from the vat 10 by the screw 11 are suitably treated to produce a stock feed. However, if the material being treated does not include solids intended for feeding, then any other suitable discrete material, such as asbestos, fuller's earth, or the like, may be charged into the tank 16 through the chute 39 for the purpose of forming a mat upon each of the trays 26 to assist in arresting the fine solids suspended in the liquid in the tank 16.

As the trays 26 move around the sprockets 20 and 21, their inner free ends are turned downwardly, so that the mat of solid particles collected thereon will be caused to slide off such inner free ends. Arranged beneath the axis of the sprockets 20 and 21 is an inclined chute 40 which will receive material so dropped when the trays 26 to conduct the same out of the tank 16. In the particular embodiment of the invention illustrated herein, the chute 40 leads back to the vat 10, so that such solid materials are redischarged into the vat 10.

Some of the fine material so returned to the vat 10 will, of course, enter into suspension in the liquid in the vat 10 to be carried again through the separating circuit above described; but much of those fine solids will be entrained in the mass of coarser solids introduced through the chute 39, and so will sink in the vat 10 to be carried to the discharge outlet by the screw 11.

It will be noted that the system is substantially closed to guard against undue evaporation loss of the solvent. In practice, it has been found that the mechanism herein disclosed very effectively removes the solids from the mixture discharged through the outlet 14, so that substantially clear liquid is discharged through the outlet 37. If it is found that material tends to collect in the chute 40, a small conveyor screw may be mounted therein, and be suitably driven, to carry such material back to the vat 10.

I claim as my invention:

1. In a liquid-and-solid handling mechanism, a vat, conveyor means for moving solid material through said vat, an inlet for admitting fluent material to said vat and an outlet for discharging fluent material from said vat so arranged as to establish a flow of fluent material through said vat in a direction counter to the movement of solid material through said vat by said conveyor means, a tank having separate, substantially vertical legs joined at their bottoms, an inlet to one of said legs communicating with said vat outlet, an outlet from the other of said legs, liquid flow through said tank being from said inlet through the juncture at the bottoms of said legs to said outlet, a series of foraminous trays, and means for moving said trays past said tank outlet, through said juncture and past said inlet in a direction counter to the flow of liquid through said tank to separate the solids from such liquid, and for then removing said trays from such liquid.

2. In a liquid-and-solid handling mechanism, a vat, conveyor means for moving solid material through said vat, an inlet for admitting fluent material to said vat and an outlet for discharging fluent material from said vat so arranged as to establish a flow of fluent material through said vat in a direction counter to the movement of solid material through said vat by said conveyor means, a tank having separate, substantially vertical legs joined at their bottoms, an inlet to one of said legs communicating with said vat outlet, an outlet from the other of said legs, liquid flow through said tank being from said inlet through the juncture at the bottoms of said legs to said outlet, a series of foraminous trays, and means for moving said trays past said tank outlet, through said juncture and past said inlet in a direction counter to the flow of liquid through said tank to separate the solids from such liquid, and for then removing said trays from such liquid, and means for introducing coarsely divided insoluble material into said other tank leg.

3. In a liquid-and-solid handling mechanism, a vat, conveyor means for moving solid material through said vat, an inlet for admitting fluent material to said vat and an outlet for discharging fluent material from said vat so arranged as to establish a flow of fluent material through said vat in a direction counter to the movement of solid material through said vat by said conveyor means, a tank having separate, substantially vertical legs joined at their bottoms, an inlet to one of said legs communicating with said vat outlet, an outlet from the other of said legs, liquid flow through said tank being from said inlet through the juncture at the bottoms of said legs to said outlet, a series of foraminous trays, and means for moving said trays past said tank outlet, through said juncture and past said inlet in a direction counter to the flow of liquid through said tank to separate the solids from such liquid, and for then removing said trays from such liquid, and means receiving material discharged from said trays after removal thereof from such liquid and conducting the same from said tank.

4. In a liquid-and-solid handling mechanism, a vat, conveyor means for moving solid material through said vat, an inlet for admitting fluent material to said vat and an outlet for discharging fluent material from said vat so arranged as to establish a flow of fluent material through said vat in a direction counter to the movement of solid material through said vat by said conveyor means, a tank having separate, substantially vertical legs joined at their bottoms, an inlet to one of said legs communicating with said vat outlet, an outlet from the other of said legs, liquid flow through said tank being from said inlet through the juncture at the bottoms of said legs to said outlet, a series of foraminous trays, and means for moving said trays past said tank outlet, through said juncture and past said inlet in a direction counter to the flow of liquid through said tank to separate the solids from such liquid, and for then removing said trays from such liquid, and means receiving material discharged from said trays after removal thereof from such liquid and delivering the same to said vat.

HARRY TRUAX.

REFERENCES CITED

The following references are of record in the file of this patent:

UNITED STATES PATENTS

| Number | Name | Date |
| --- | --- | --- |
| 550,035 | Wheeler | Nov. 19, 1895 |
| 550,033 | Wheeler | Nov. 19, 1895 |
| 2,273,557 | Bonotto | Feb. 17, 1942 |
| 1,081,949 | DuPont | Dec. 23, 1913 |